United States Patent Office 2,907,741
Patented Oct. 6, 1959

2,907,741

COMPOSITIONS OF NOVEL POLYHYDRIC PHENOLS AND POLYEPOXIDES

Sylvan O. Greenlee, Racine, Wis., assignor to S. C. Johnson & Son, Inc., Racine, Wis.

No Drawing. Application March 29, 1957
Serial No. 649,307

19 Claims. (Cl. 260—44)

This invention relates to new products and compositions resulting from the reaction of polyepoxides with polyhydric phenols and the modification of such compositions with condensates of aldehydes and ammonia derivatives or condensates of aldehydes and phenols to produce valuable compositions useful in the manufacture of varnishes, molding compositions, adhesives, films, and molded articles. More particularly, the polyhydric phenols are the reaction products of hydroxyaryl-substituted aliphatic acids and at least one member of the group consisting of a polyhydric alcohol and a polyamine. The invention includes initial mixtures or compositions as well as intermediate and final reaction products and methods for their production.

It is an object of this invention to produce new compositions of matter from suitable proportions of a polyhydric phenol and polyepoxide, with or without modification with aldehyde condensates, which compositions are suitable for use in coating compositions, molding compositions, and adhesives.

Another object of this invention is the production of reaction mixtures of the aforesaid epoxides and polyhydric phenols, with or without aldehyde condensates, which are capable of reaction on the application of heat to form insoluble, infusible products.

Another object of this invention is the production of new reaction mixtures as described above which are stable at ordinary temperatures for long periods of time and which may be converted to insoluble, infusible products by the application of heat with or without the addition of catalyst.

Another object of this invention is to provide for production of co-conversion products of polyepoxides and polyhydric phenols, aforesaid products modified with aldehyde condensates, with such co-conversion products being characterized by extreme hardness, flexibility, and resistance to water, alkali, and organic solvents.

Other objects of the invention will appear from the following more detailed description and with particular reference to the illustrative examples.

It is well known in the art that polyepoxides are extremely valuable in the formulation of polymeric infusible, insoluble products. Such value in polymeric compositions can be attributed largely to such characteristics as their reactivity with a variety of functional groups such as the active hydrogen-containing compounds of sulfur, nitrogen, and oxygen; to their small shrinkage and their property of hardening usually without the evolution of volatiles. To these valuable fundamental properties can be added their practical convenience and the wide range of properties available from different types of epoxide. In the use of polyepoxides in polymeric compositions, a major problem encountered has been the selection of a proper co-reactant which will give the necessary toughness and hardness and still remain flexible. In this invention a new series of polyhydric phenols have been reacted with polyepoxides to provide compositions having exceptional resistance to chemicals and water, having hardness and toughness together with desirable flexibility.

In general, the epoxides contemplated for use with the present co-reactant are compounds containing an average of more than one up to about twenty epoxide groups per molecule. Such compounds, free from functional groups other than epoxide, carboxyl, and hydroxyl groups, and are reactive with active hydrogen-containing groups such as the hydroxyl groups supplied by the polyhydric phenols herein contemplated. Typical epoxides which have been found to be operable are complex resinous polyepoxides, resinous polyepoxide polyesters, epoxidized natural oils, and simple aliphatic polyepoxides.

The reaction products of this invention are readily prepared by converting the epoxide groups with the polyhydric phenols which are derivatives of a bis(hydroxyaryl) substituted aliphatic acid and a polyhydric alcohol and/or a polyamine. This invention also contemplates the modification of such compositions with aldehyde condensates. Conversion of the epoxide groups is effected by active hydrogen present in the phenolic hydroxyl, methylol, or amino and amido groups which are supplied by the other reactants.

In the preparation of the polyhydric phenols employed herein as co-reactants with the polyepoxides, a large degree of freedom is available in the choice of starting reactants resulting in variety in the final characteristics of the compositions. A polyhydric alcohol, such as glycerine, can be reacted with 4,4-bis(4-hydroxyphenyl) pentanoic acid as in I or a polyamine such as diethylenetriamine can be reacted with the same acid as in II.

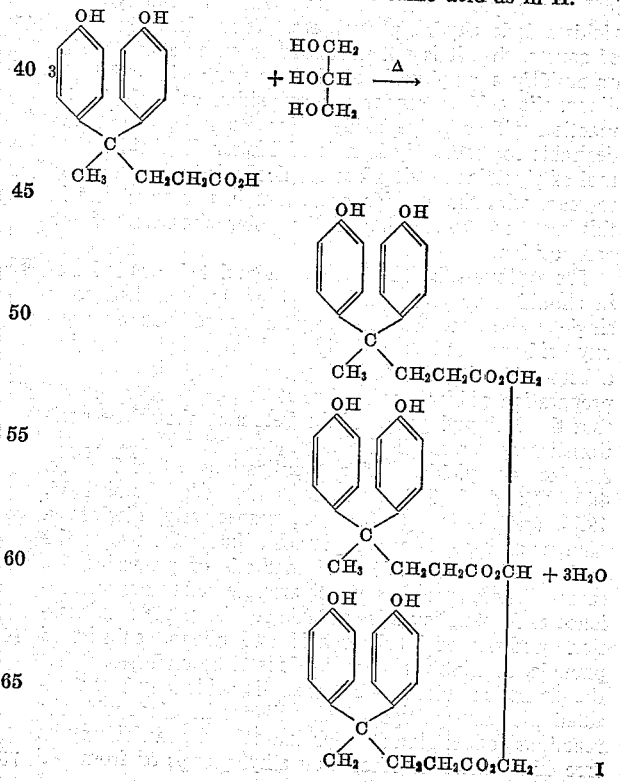

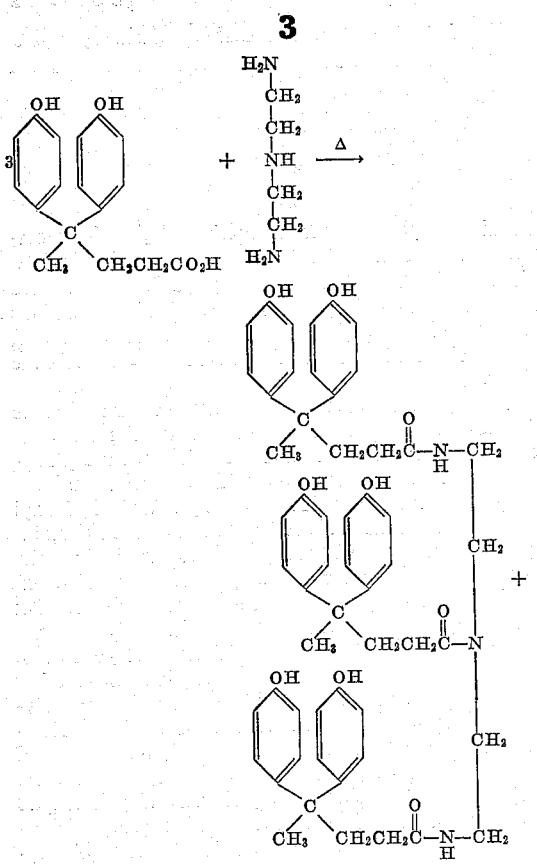

It can be readily seen on examination of the structural formula of these compounds that a larger number of active phenolic hydroxyl groups can be made available on the same nucleus than was heretofore possible. The preparation of a great variety of polyhydric phenols is possible merely by varying the polyhydric alcohol or polyamine employed for esterification or amidification. Fully esterified by a 4,4-bis(hydroxyphenyl) pentanoic acid, ethylene glycol yields a tetrahydric phenol, glycerol, as in I above, yields a hexahydric phenol, dipentaerythritol yields a dodecahydric phenol, etc. It should be realized, of course, that it is not necessary to completely esterify or amidify a polyhydric alcohol or polyamine with the diphenolic acid to render a composition valuable in the reaction with a polyepoxide. For example, it may be desirable to react only 2 mols of Diphenolic Acid with a mol of glycerine leaving free an alcoholic hydroxyl group to react with the epoxide or to remain unreacted and in this manner contributing to the polar character of the composition.

The aryloxy-substituted acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid should be positioned next to a terminal methyl group in order to obtain satisfactory yields. Prior applications, Serial Nos. 464,607 and 489,300 (now abandoned) filed October 25, 1954, and February 18, 1955, respectively, disclose a number of illustrative compounds suitable for use as the aryloxy-substituted acid, and methods of preparing the same. These materials, which are referred to for convenience as diphenolic acids or DPA, consist of the condensation products of levulinic acid and phenol, substituted phenols, or mixtures thereof. It is to be understood that the phenolic nuclei of the diphenolic acids may be substituted with any groups which will not interfere with the reactions contemplated. For example, the nuclei may be free of substituents other than alkyl groups of from 1–5 carbon atoms as disclosed in Serial No. 489,300 or they may be halogenated. The diphenolic acids derived from substituted phenols, such as the alkylated phenols, are sometimes more desirable than the products obtained from the unsubstituted phenols since the alkyl groups impart better organic solvent solubility, flexibility and water-resistance. However, the unsubstituted product is usually more readily purified.

The polyhydric alcohols used in the preparation of the polyhydric phenols employed herein may be of the non-resinous type or of the resinous type. Suitable non-resinous polyhydric alcohols are the straight or branched chain aliphatic or cyclic compounds including the simple glycols such as ethylene glycol, propylene glycol, 1,4-butane-diol, 2,5-pentane-diol, and neopentyl glycol; polyhydroxy ethers such as the polymeric polyhydric alcohols exemplified by polyalkylene glycols such polyethylene glycol, polypropylene glycol, etc. Others contemplated include glycerol, erythritol, pentaerythritol, polypentaerythritols, sorbitol, mannitol, alpha-methyl glucoside, polyallyl alcohols, tetramethylol cycohexanol, etc.

Illustrating resinous polyhydric alcohols which may be used are the reaction products of di- and trihydric phenols with chlorohydrins. For example, the reaction of bis(4-hydroxyphenyl)isopropylidene with ethylene chlorohydrin or glycerol monochlorohydrin yields a resinous polyhydric alcohol. The reaction of the same dihydric phenol with epichlorohydrin or glycerol dichlorohydrin produces resinous polyhydric alcohols which in some cases contain epoxide groups in addition to the alcoholic hydroxyl groups. (The epoxide-containing products are well illustrated by the commercially available Epon resins.) The preparation of these resinous polyhydric alcohols is described in U.S. Patents 2,456,408, 2,503,726, 2,615,008, 2,668,805 and 2,668,807.

Other types of resinous polyhydric alcohols are those prepared by the reaction of phenol-formaldehyde condensates with chlorohydrins. An alkyl phenol may be condensed with formaldehyde, followed by treatment of an alkaline solution of this intermediate methylol derivative with a chlorohydrin such as glycerol monochlorohydrin, to form a resinous polyhydric alcohol. It is contemplated that the resinous polyhydric alcohols may in some cases contain epoxide groups. Since the latter are essentially anhydrides of glycols, on esterification with carboxylic acids, they act as glycols and increase the alcoholic hydroxyl content of the resinous polyhydric alcohol.

A large number of polyamines are also suitable for use in preparing the herein described series of polyhydric phenols. They may be aliphatic, aromatic, substituted with other functional groups, or unsubstituted. It is necessary that the amines used contain at least two primary or secondary amine groups. The substituted materials contemplated are those which contain functional groups which will not interfere with the reaction of the diphenolic acid through its carboxyl group. For example, polyamines containing a carboxyl group, such as diamino benzoic acid, would be unsuited since the amidification of the diphenolic acid would be competing with the amidification of the benzoic acid carboxyl group. Amino ethers or hydroxyamines are examples of suitable substituted compounds. The aliphatic polyamines may be either high or low molecular weight compounds. Illustrative low molecular weight polyamines are ethylene-diamine, trimethylenediamine, propylenediamine-1,2-tetramethylenediamine, hexamethylenediamine, diethylenetriamine, and triethylenetetramine. These amines are conveniently prepared by the reaction of ammonia with the alkyl halides or by reacting glycols with ammonia in the presence of a contact catalyst, the primary, secondary, and tertiary amines being conveniently separated by boiling point differences or by extraction. These low molecular weight aliphatic polyamines are usually obtained commercially as aqueous solutions and are conveniently used in this reaction as such, thus eliminating the necessity of stripping off water before use. The high molecular weight polyamines are usually prepared from polymerized fatty acids such as capric, undecanoic, lauric, myristic, palmitic, stearic, oleic, linoleic, linolenic, etc. The most important of the high molecular weight polyamines are those derived from the dimer acids of long-chain fatty acids such as soya bean and linseed oil fatty acids but polyamines from the higher molecular weight glycols are also practical reactants. Additional aliphatic amines which are advantageously used are the polyalkanol amines such as diethanol amine and triethanolamine, the resultant polyhydric phenol being a mixed amide-ester.

Operable aromatic polyamines are the mononuclear, non-fused polynuclear and fused polynuclear polyamines. Many of the first two types may be described as phenylenepolyamines, wherein two of the aromatic hydrogens are replaced by amino groups or organic radicals containing the same. Illustrative compounds are p-phenylene diamine, aminobenzyl phenyleneamine, tri(p-aminophenyl)methane, and diamino diphenylamine. Other non-fused compounds include those having more than two of the aromatic hydrogens replaced by amino groups or other radicals, e.g. toluene-2,4-diamine and 3,3'-bitolylene-4,4'-diamine.

The characteristics of the polyhydric phenols can be varied to a large extent as herein before stated by the selection of the polyamine or polyhydric alcohol to be reacted with the diphenolic acid. For example, if a long-chain polyamine or polyhydric alcohol is used, the resulting product would probably be more flexible than if a short-chain compound were used. Alternatively, if an aromatic polyamine were employed, the polyhydric phenol would probably be higher melting than if an aliphatic polyhydric alcohol were used. The number of functional groups present in the polyamine or polyhydric alcohol will also serve to influence the characteristics of the final polyhydric phenol. A polyamine or polyhydric alcohol having two functional groups will yield a less complex composition with a greater degree of solvent solubility than would a compound having a larger number of functional groups.

In general, the reaction of the polyhydric phenols or polyamines with the diphenolic acids is carried out in the usual manner of esterification or amidification known in the art. The procedures used are fully described in the copending applications having Serial Nos. 503,324 (now abandoned) and 608,171, filed respectively on April 22, 1955, and September 5, 1956. Esterification of either the nonresinous or resinous polyhydric alcohols with diphenolic acids is conveniently carried out by direct heating at temperatures of from 190–275° C. under conditions such that the water produced during condensation is continuously removed as it is formed. Where a composition of the Epon resin type is esterified only to the extent of one carboxyl group reacting with one epoxide group, lower temperatures may be used and no water is formed since the reaction of the carboxyl group with the epoxide group is that of direct addition. Since the diphenolic acids and the polyhydric alcohols have boiling points which are in all cases above 190° C., the water may be removed by permitting it to volatilize during esterification. Removal of the water may also be facilitated by continuously bubbling through the reaction mixture during esterification a stream of inert gas, such as carbon dioxide or nitrogen. It is also sometimes convenient to remove water by carrying out the reaction in a vessel provided with a condenser attached thereto through a water trap, adding a sufficient amount of a volatile, water-insoluble solvent to cause refluxing at the esterification temperature, continually removing the water by azeotropic distillation and permitting the solvent to return to the reaction mixture after having dropped the water in the water trap. Other methods of esterification are contemplated, including esterification of the polyhydric alcohols with acid chlorides, and esterification by acid interchange of the high molecular weight acid with polyesters of low-molecular weight acids such as acetic.

Amidification of the polyamines with diphenolic acids likewise is conveniently carried out by direct heating at temperatures of from 175–275° C. under conditions such that water produced during condensation is continuously removed as it is formed. Since the diphenolic acids have boiling points higher than the amidification temperature range used, and since the amines are polyfunctional and form salts immediately on contact with the diphenolic acids, no difficulty is encountered in carrying out the reaction in the temperature range of 175–275° C. even with the lower boiling amines, such as ethylene diamine. By this process, the polyamine is slowly added with agitation to the molten diphenolic acid. Alternatively it may be convenient to carry out the reaction in the presence of water, initially forming an amine salt. The aqueous slurry is gradually heated to reflux and water removed until the above optimum reaction temperature is reached. The water formed during amidification may be removed by merely permitting it to volatilize, or removal may be facilitated by continuously bubbling through the reaction mixture during amidification a stream of inert gas, such as carbon dioxide or nitrogen. It is also sometimes convenient to facilitate the water removal as described in the esterification process above, by carrying out the reaction in a vessel provided with condenser attached thereto through a water trap and using a volatile, water-insoluble solvent.

Although the polyhydric phenols as used herein can be prepared through the reaction of at least one member of the group consisting of a polyhydric alcohol and a polyamine with the novel bis(hydroxyaryl)alkylidene monocarboxylic acid as described above, it should be appreciated that distinct advantages can be obtained in certain instances by the proper selection of a polyhydric alcohol or polyamine, the choice being dependent on the end uses and characteristics desired in the final product. For example, generally the polyhydric phenols which have ester linkages are superior in regard to color and are therefore more applicable in coatings in which the color of the final product is of primary importance. Solvent solubility of the polyester-polyhydric phenols in solvents commonly used in the protective coating industry is also usually decidedly better. In addition, the polyester-polyhydric phenols have sometimes been found to be easier to prepare. The polyamide-polyhydric phenols will more readily convert polyepoxides due to the presence of additional reactive hydrogen atoms attached to the nitrogen of the polyamide. As a result of this increased functionality, a more complex, harder, more rigid product can be obtained.

Examples 1 through 7 illustrate a selective group of polyhydric phenols derived from polyamines and Examples 8 through 12 will illustrate a selection of polyhydric phenols containing ester linkages. Proportions expressed refer to parts by weight unless otherwise indicated. Softening points as used herein were run by the Durrans' Mercury Method (Journal of Oil and Color Chemists' Association, 12, 173–175 [1929]). Acid values are defined as the number of milligrams of potassium hydroxide equivalent to the free acid contained in a 1-gram sample. Amine values as used herein are defined as the number of milligrams of potassium hydroxide equivalent to the free amine contained in a 1-gram sample. These values were determined by electrometric titration.

EXAMPLE 1

In a 2-liter 3-necked flask equipped with thermometer, stirrer, and reflux condenser was placed 572 parts DPA, 63 parts ethylenediamine as a 95% aqueous solution, and 300 parts of water. The reaction mixture was refluxed for 55 minutes after which, upon incorporation of a suitable trap between the condenser and flask, water was distilled from the reaction mixture during a 4-hour period. The flask temperature rose to 238° C., 330 parts of water were isolated, and when no more distillate could be obtained, the resultant product, 571 parts of the diamide of 4,4-bis(4-hydroxyphenyl)pentanoic acid and ethylene diamine was isolated. It had an amine value of 1.8, an acid value of 14, and a softening point of 110° C.

EXAMPLE 2

In a 2-liter 3-necked flask equipped with thermometer, stirrer and reflux condenser was placed 572 parts DPA, 87 parts propylenediamine-1,2 as an 85% aqueous solution, and 300 parts of water. The reaction mixture was refluxed for 1 hour and 25 minutes after which, upon incorporation of a suitable trap between the condenser and flask, water was distilled from the reaction mixture during a 5-hour period. The flask temperature rose to 219° C., 330 parts of water were isolated, and when no more distillate could be obtained, the resultant product, 502 parts of the diamide of 4,4-bis(4-hydroxyphenyl)pentanoic acid and propylenediamine-1,2 was isolated. It had an amine value of 42, an acid value of 0, and a softening point of 115° C.

EXAMPLE 3

In a 2-liter 3-necked flask equipped with thermometer, stirrer and reflux condenser was placed 406 parts DPA, 74 parts diethylenetriamine and 200 parts of water. The reaction mixture was refluxed for 35 minutes after which upon incorporation of a suitable trap between the condenser and flask water was distilled from the reaction mixture during a 7-hour period. The flask temperature rose to 215° C., 236 parts of water were isolated, and when no more distillate could be obtained, the resultant product, 399 parts of the diamide of 4,4-bis(4-hydroxyphenyl)pentanoic acid and diethylenetriamine were isolated. It had an amine value of 71, an acid value of 31, and softening point of 128° C.

EXAMPLE 4

In a 2-liter 3-necked flask equipped with thermometer, stirrer and reflux condenser was placed 286 parts DPA, 73 parts triethylenetetramine, and 200 parts of water. The reaction mixture was refluxed for 1 hour after which upon incorporation of a suitable trap between the condenser and flask water was distilled from the reaction mixture during a 7-hour period. The flask temperature rose to 202° C., 213 parts of water were isolated, and when no more distillate could be obtained, the resultant product, 364 parts of the diamide of 4,4-bis(4-hydroxyphenyl)pentanoic acid and triethylenetetramine was isolated. It had an amine value of 96, an acid value of 0, and a softening point of 117° C.

EXAMPLE 5

In a 2-liter 3-neck flask equipped with thermometer, stirrer, and reflux condenser was placed 286 parts DPA and 80 parts hexamethylene diamine as a 70% aqueous solution. Upon incorporation of a suitable trap between the condenser and the flask water was distilled from the reaction mixture during a period of 16 minutes. The flask temperature rose to 252° C., 36 parts of water were isolated, and when no more distillate could be obtained, the resultant product, 326 parts of the diamide of 4,4-bis(4-hydroxyphenyl) pentanoic acid and hexamethylene diamine was isolated. It had an amine value of 10.5, an acid value of 0, and a softening point of 83° C.

EXAMPLE 6

In a 2-liter 3-necked flask equipped with thermometer, stirrer, and reflux condenser was placed 572 parts DPA, 108 parts p-phenylenediamine, and 300 parts of water. The reaction mixture was refluxed for 1 hour and 15 minutes after which upon incorporation of a suitable trap between the condenser and flask water was distilled from the reaction mixture during a 4-hour period. The flask temperature rose to 240° C., 336 parts of water were isolated, and when no more distillate could be obtained, the resultant product, 610 parts of the diamide of 4,4-bis(4-hydroxyphenyl)pentanoic acid and p-phenylenediamine was isolated. It had an amine value of 7.2, an acid value of 19.4, and a softening point of 91° C.

EXAMPLE 7

In a 2-liter 3-necked flask equipped with a thermometer, stirrer and reflux condenser was placed 286 parts DPA, 99 parts p,p′-methylene dianiline, and 200 parts of water. Upon incorporation of a suitable trap between the condenser and flask water was distilled from the reaction mixture during a 6-hour period. The flask temperature rose to 220° C., 214 parts of water were isolated, and when no more distillate could be obtained, the resultant product, 359 parts of the diamide of 4,4-bis(4-hydroxyphenyl)pentanoic acid and methylene dianiline were isolated. It had an amine value of 2.3, an acid value of 19.1, and a softening point of 164° C.

EXAMPLE 8

A mixture of 286 parts 4,4-bis(4-hydroxyphenyl)pentanoic acid and 31 parts ethylene glycol was charged to a 500 ml. 3-necked flask equipped with thermometer, stirrer and reflux condenser. Heat was applied using an electric heating mantle. The temperature was raised to 140° C. and agitation was started while slowly adding a sufficient amount of xylene to more easily control the temperature. The charge was then heated to reflux and allowed to reflux in the range of 155° C. for approximately 6 hours while taking off water by means of a suitable water trap. The temperature was then raised to approximately 192° C. while distilling over water and xylene. The temperature was held at 190° C. while vacuum was applied to the reaction system to remove the final traces of water and solvent. The resultant product had an acid value of 15 and a softening point of 98° C.

EXAMPLE 9

286 parts 4,4-bis(4-hydroxphenyl)pentanoic acid and 46 parts of glycerol were charged to a 500 ml. 3-necked flask equipped with thermometer, stirrer, and reflux condenser provided with a water trap. Heat was applied using an electric heating mantle. A sufficient amount of xylene was added in order to more easily control the temperature and to facilitate the removal of water. The temperature was raised to approximately 160° C. and allowed to reflux for approximately 5 hours at which time the temperature was increased to 190–200° C. and held for 2½ hours. A vacuum was applied to the system at this temperature to remove the final traces of water and solvent. The final polyhydric phenol had an acid value of 5.8 and a softening point of 99° C.

EXAMPLE 10

286 parts 4,4-bis(4-hydroxyphenyl)pentanoic acid were charged to a 500 ml. 3-necked flask equipped with thermometer, stirrer, reflux condenser, and suitable water trap. Heat was applied using an electric heating mantle. The temperature was raised to approximately 210° C. and 40 parts of pentaerythritol were added. The temperature dropped temporarily during the addition but was again raised to 230° C. after sufficient xylene had been added to more easily control the temperature and was held at this temperature for 5 hours at which time vacuum was applied to the system to remove the final traces of water and xylene. The polyhydric phenol had an acid value of 3.5 and a softening point of 109° C.

EXAMPLE 11

286 parts 4,4-bis(4-hydroxyphenyl)pentanoic acid were charged to a 500 ml. 3-necked flask equipped with thermometer, stirrer, reflux condenser, and water trap. Heat was applied using an electric heating mantle. The temperature was raised to 185° C. and 61 parts of sorbitol were added over a period of 4 minutes. The temperature dropped to 167° C. The temperature was again raised to 205° C. with inert gas being passed over the reaction medium to facilitate the removal of water from the system. The reaction was held at this temperature for approximately 8 hours at which time vacuum was applied to the system to remove the final traces of water. The final product had an acid value of 8.9 and a softening point of 120° C.

EXAMPLE 12

286 parts 4,4-bis(4-hydroxyphenyl)pentanoic acid were charged to a 1-liter 3-necked flask equipped with thermometer, stirrer, reflux condenser, and water trap. Heat was applied using an electric heating mantle. The temperature was raised to 200° C. at which time the 4,4-bis(4-hydroxyphenyl)pentanoic acid was molten and forty-four parts trimethylol ethane was added with agitation. The temperature dropped temporarily during the addition to 180° C. but was again raised to 230° C. and held for approximately 6 hours with inert gas being passed over the reaction medium to facilitate the removal of water from the system. Vacuum was applied to remove the final traces of water before casting the resin. The final product had an acid value of 3.0 and a softening point of 103° C.

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic nuclei connected to each other by ether linkages, containing terminal epoxide groups and free from functional groups other than epoxide and hydroxyl groups. It should be understood that significant amounts of the monomeric reaction products are often present. This would be illustrated at III to V below where $n$ equals zero. Preparation of these epoxide materials as well as illustrative examples are described in U.S. Patents, 2,456,408, 2,503,726, 2,615,007, 2,615,008, 2,688,805, 2,668,807, and 2,698,315. Well known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

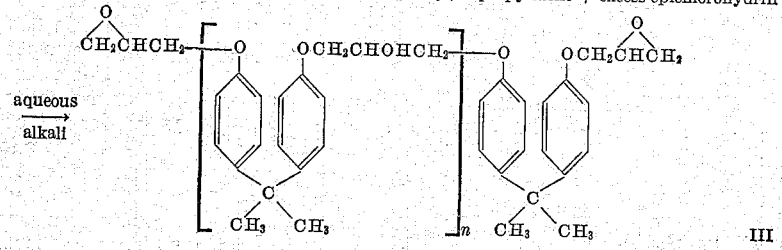
III

Polyhydric phenol and a polyepoxide bis(hydroxyphenyl)isopropylidene + excess butylene dioxide

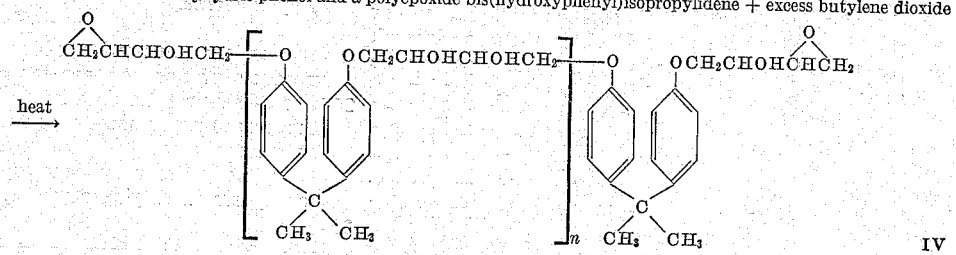
IV

Polyhydric phenol and a polyhalohydrin bis(hydroxyphenyl)isopropylidene + excess alpha-glycerol dichlorohydrin

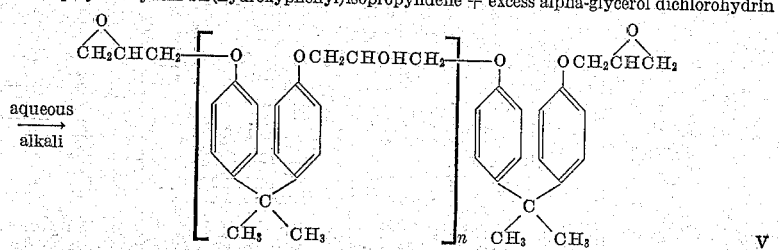
V

As used in the above formulas, $n$ indicates the degree of polymerization, and its value depends on the molar ratio of reactants. As can be seen from these formulas, the complex epoxide resins used in this invention contain terminal epoxide groups, and alcoholic hydroxyl groups attached to the aliphatic portions of the resin, the latter being formed by the splitting of epoxide groups in the reaction of the same with phenolic hydroxyl groups. Ultimately the reaction with the phenolic hydroxyl groups of the polyhydric phenols is accomplished by means of epoxide groups formed from halohydrins by the loss of hydrogen and halogen generally as shown by the following equation:

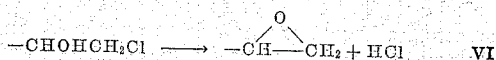
VI

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid much as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955, now forfeited.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long-chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain from more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid, and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion as illustrated by the following:

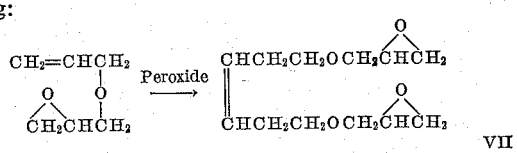

This reaction may be carried further to give higher polymers than the dimer shown. Other aliphatic polyepoxides useful in this invention may be illustrated by the poly(epoxyalkyl) ethers derived from polyhydric alcohols. These materials may in general be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

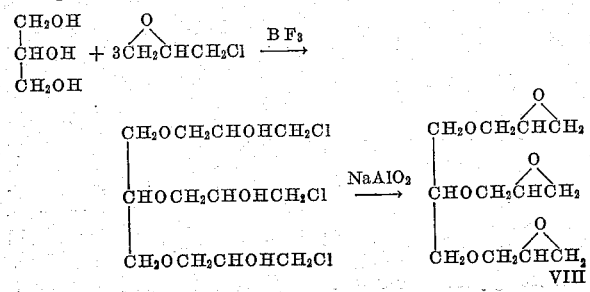

It is to be understood that such reactions do not give pure compounds, and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive, and are not to be considered as functional groups in the conversion of the reaction mixtures of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis (4-hydroxyphenyl)isopropylidene with a molar excess of epichlorohydrin in varying amounts.

| Epon resin type | Melting point, °C. | Viscosity [1] (Gardner-Holdt) | Epoxide equivalent | Average molecular weight |
| --- | --- | --- | --- | --- |
| Epon 864 | 40–45 | A–B | 325 | 450 |
| Epon 1001 | 64–76 | C–G | 480 | 640 |
| Epon 1004 | 95–105 | Q–U | 870 | 1,133 |
| Epon 1007 | 127–133 | Y–Z₁ | 1,750 | |

[1] Based on 40% nonvolatile in butyl Carbitol at 25° C.

Examples 13 through 15 describe the preparation of typical polyepoxide polyesters.

EXAMPLE 13

*Preparation of Polyester from tetrahydrophthalic anhydride and ethylene glycol*

In a 3-neck flask provided with a thermometer, mechanical agitator, and reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

*Epoxidation of the polyester resin*

In a 3-neck flask provided with a thermometer, a mechanical agitator, and a reflux condenser was placed 107 parts of the dehydrated acid form of a cation exchange resin (Dowex 50 X–8, 50–100 mesh, Dow Chemical Company, a sulfonated styrene-divinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyrighted 1954 by Dow Chemical Company, the publications having form number SP32–254 and SP31–354, respectively) and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 4.2. The percent nonvolatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula RR'$_3$N+OH- where R represents the styrene-divinylbenzene matrix and R' is a methyl group, manufactured by the Dow Chemical Company. The resulting mixture was then filtered followed by pressing as much of the solution as possible from the anion exchange resin cake. This product had an acid value of 4.5 and an epoxide equivalent of 288 based on a nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then backtitrated with standard alcoholic sodium hydroxide.

EXAMPLE 14

Following the procedure of Example 4, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

EXAMPLE 15

The process of Example 4 was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Example 16 describes the preparation of an epoxidized vegetable oil acid ester.

EXAMPLE 16

Epoxidized soya bean oil acid modified alkyd resin (a) PREPARATION OF ALKYD RESIN To a kettle provided with a condenser was added 290 parts of white refined soya bean oil. While bubbling a continuous stream of nitrogen through this oil, the temperature was raised to 250° C., at which temperature 0.23 part of litharge was added and the temperature held at 250° C. for 5 minutes. While holding the temperature above 218° C., 68 parts of technical pentaerythritol was added after which the temperature was raised to 238° C. and held until a mixture of 1 part of the product and 2½ parts of methyl alcohol showed no insolubility (about 15 minutes). At this point 136 parts of phthalic anhydride was added and the temperature gradually raised to 250° C. and held at this temperature for 30 minutes. At this point the condenser was removed from the kettle and the pressure reduced somewhat by attaching to a water aspirator evacuating system. With continuous agitation the mixture was then held at 250° C. until the acid value had reached 10.5. At this point the resin was thinned with xylene to 48% nonvolatile content having a viscosity of H (Gardner bubble viscosimeter).

(b) EPOXIDATION OF A SOYA BEAN OIL ACID MODIFIED ALKYD RESIN

In a 3-neck flask provided with a thermometer, a mechanical agitator and a reflux condenser was placed 70 parts of dehydrated acid form of a cation exchange resin (Dowex 50 X-8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution was thoroughly mixed with 110 parts of the dehydrated basic form of Dowex 1 (an amine type anion exchange resin). The resulting mixture was then filtered, followed by pressing as much of the solution as possible from the anion exchange resin cake.

Examples 17 and 18 describe the preparation of simple aliphatic polyepoxides.

EXAMPLE 17

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature the inorganic material was removed by filtration. The dioxane and low boiling products were removed by heating the filtrate to 205° C. at 20 mm. pressure to give 260 parts of a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and backtitrating the excess pyridine hydrochloride with 0.1 N sodium hydroxide using phenolphthalein as indicator and considering one HCl as equivalent to one epoxide group. The epoxide equivalent on this product was found to be 152.

EXAMPLE 18

In a 3-neck flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide dissolved in diethyl phthalate to a 60% content was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418 and equivalent weight to epoxide content of 198 the yield amounting to 250 parts.

As indicated, the products of the reaction between a polyepoxide and polyhydric phenol may be modified with an aldehyde condensate. Two general classes of aldehyde condensates are contemplated for preparing the modified products of this invention, those prepared from ammonia derivatives and those derived from phenols, with the choice being dependent on the end uses and characteristics desired. For instance, if the end use were to be a white enamel, the ammonia derivative-aldehyde condensates would probably be chosen because of their extremely light initial color and their good color retention, the phenols are somewhat darker in color and have a tendency to yellow upon aging. For the most desirable non-polar solvent solubility, the phenol-aldehyde condensates would be the proper choice since the ammonia derivative-aldehyde condensates usually require some butanol and xylol present to give the desirable solubility. For certain applications, the butanol odor is objectionable and at times incompatible with the resin with which it is used. Adhesion to metals also appears to be better in the phenol-aldehyde condensates. From an economic standpoint, the phenol-aldehyde condensates are advantageous, being lower in price.

The aldehyde-ammonia derivative condensation products are formed by the reaction of aldehydes with amines or amides such as urea, thiourea, and their derivatives, melamines and sulfonamides. It is well known that various amines and amides will react with formaldehyde to form aldehyde-amine or aldehyde-amide condensates. A number of derivatives of the amines and amides mentioned are also contemplated herein. Exemplary derivatives are substituted urea, thiourea, or melamine such as the long-chain alkyl substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono- or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermediate alkylol compounds. These compounds will further condense to form more resinous materials, combining with each other through alkylene bridges formed between the nitrogen atoms of the compounds.

In the alkylol condensate, and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, cross-linked products.

In general, the condensation products of ammonia derivatives and aldehydes contemplated herein are partial and intermediate reaction or condensation products of aldehydes, particularly formaldehyde, with amines or amides, or mixtures thereof. The reactions which produce such condensation products involve the removal of amino or amido hydrogen atoms from the ammonia derivative. Therefore, it should be understood that an ammonia derivative, in order to be suitable for condensation with an aldehyde must contain at least one hydrogen atom attached to the nitrogen atom. Fusible materials of varying degrees of condensation may be used with the epoxides and the polyhydric phenols to form the new compositions and reaction products of this invention. Thus, the condensates may be made by various processes known in the art for the manufacture of aldehyde-ammonia derivative resins, resulting in water-soluble, alcohol-soluble or oil-soluble types.

For use herein, the aldehyde-ammonia derivative condensate may be in its monomeric form which is essentially an alkylol or polyalkylol product or it may be highly condensed. It is suitable as long as it is still fusible and is soluble in or compatible with the epoxide composition and the polyhydric phenol composition with which it is to be reacted.

Many of the commercial products derived from the reaction of urea, thiourea, or melamine with formaldehyde are mixed products made by reacting the formaldehyde with mixtures of these materials. Such composite or mixed reaction products can advantageously be used for reaction with the epoxides and the polyhydric phenols according to the present invention. In addition, many of the present day commercial resins derived from aldehydes and urea, thiourea, or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve the epoxide and the polyhydric phenol. Solutions prepared in this manner can be applied as a coating and the solvent subsequently evaporated before the main reaction between the epoxide, polyhydric phenol, and condensate takes place.

Examples 19 to 23 inclusive describe the preparation of typical ammonia derivative-aldehyde condensates suitable for use herein.

EXAMPLE 19

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white, syrupy liquid isolated.

EXAMPLE 20

The procedure of preparation including the water removal was the same as that used in Example 11. A mixture of 304 parts of thiourea, 960 parts of 37% aqueous formaldehyde, and 800 parts of n-butyl alcohol was used to give a final yield of 1214 parts of a clear, light amber, syrupy product.

EXAMPLE 21

The procedure of preparation including the removal of water was the same as that used in Example 11. A mixture of 120 parts of urea, 148 parts of thiourea, 950 parts of 37% aqueous formaldehyde, and 800 parts of n-butyl alcohol was used to give a final yield of 1175 parts of a clear, almost colorless, syrupy liquid.

EXAMPLE 22

In a 3-liter 3-neck flask provided with a mechanical agitator, a thermometer, and reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water white, heavy, syrupy liquid.

EXAMPLE 23

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30-50 mm. pressure, using a maximum flask temperature of 90° C. to yield 1245 parts of water white resinous solid.

The second class of condensates suitable for modifying the compositions herein described are those which contain reactive phenolic hydroxyl groups, formed by the reaction of phenols and aldehydes. Phenol and formaldehyde react to form a variety of reaction products, depending upon the proportions and conditions of reaction. These include products such as phenol alcohols having both phenolic and alcoholic hydroxyl groups, and products of the diphenolmethane type containing phenolic hydroxyl groups only. The condensation of phenol and formaldehyde can be carried out with the use of acid or alkaline condensing agents and in some cases by first combining the aldehyde with an alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions, that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and polyhydric phenols for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and polyhydric phenols or with the two reactants in a solvent used as a reaction medium. The phenol-aldehyde condensate which is essentially a polymethylol phenol rather than a polymer may be used in the preparation of the new phenol-aldehyde, polyepoxide, polyhydric phenol condensation products, or it may be used after further condensation, in which case some of the methylol groups are usually considered to have disappeared in the process of condensation. Various co-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxides and polyhydric phenols and reacted therewith to form the products of this invention.

In selecting a phenol-aldehyde condensate one may choose either the heat-converting or the permanently fusible type. For example, the formaldehyde reaction products of such phenols as carbolic acid, resorcinol, and bis(4-hydroxyphenyl)isopropylidene readily convert to infusible, insoluble compositions on the application of heat. On the other hand, some of the paraalkylated phenols, as illustrated by p-tert-butylphenol, produce permanently fusible resins on reaction with formaldehyde. Even though fusible condensates are employed, however, insoluble, infusible products result when they are heated in combination with the epoxides and the polyhydric phenols described.

Examples 24 to 26, inclusive, describe the preparation of some of the operable phenol-aldehyde condensates which may be used in combination with the polyepoxides and the polyhydric phenols to form the products herein described.

EXAMPLE 24

*Condensation of bisphenol [bis(para-hydroxyphenyl)isopropylidene] with formaldehyde*

In a 3-liter, 3-neck flask provided with a mechanical agitator, a thermometer, and a reflux condenser was placed 912 parts of bisphenol A, 960 parts of 37% aqueous formaldehyde, and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three times with water which in each case was removed by decantation. The last portion of water was removed by distillation at reduced pressure using a water aspirator system which gave pressure around 30-40 mm. The temperature during the removal of this last portion of water ranged from 70-90° C. The product, amounting to 1065 parts, was a clear, heavy, syrupy material.

EXAMPLE 25

*Reaction of p-tertiary butylphenol with formaldehyde*

The procedure of preparation, including the dehydration step, was the same as that used in Example 16. A mixture of 1000 parts of p-tert-butylphenol, 1067 parts of 37% aqueous formaldehyde, and 10 parts of sodium hydroxide was used to give a final yield of 1470 parts of a clear, almost colorless syrupy product.

EXAMPLE 26

*Reaction of phenol with formaldehyde*

Again a reaction procedure including the dehydration step was the same as that used in Example 16. A mixture of 658 parts of phenol, 1400 parts of 37% aqueous formaldehyde, and 6.6 parts of sodium hydroxide was used to give a final yield of 1168 parts of a clear, syrupy product.

In making the new compositions, the polyepoxide and polyhydric phenol or such compositions modified with aldehyde condensates are admixed in suitable proportions and reaction will proceed merely by the application of heat. Here specifically the reaction is effected by heating the mixtures at elevated temperatures, usually in the range of about 100–250° C. Catalysts are unnecessary, but in certain cases it may be desirable to speed up the reaction by the use of catalysts, such as boron trifluoride adducts, sodium phenoxides, and mineral acid type catalysts. The reaction mixtures and final reaction products of this invention may be prepared by using varying ratios of epoxide to polyhydric phenol. The quantities of reactants employed in a given instance will depend upon the characteristics desired in the final product. Flexible conversion products can be obtained from a hard epoxide by employing relatively large amounts of a low-melting polyhydric phenol or a low-melting polyhydric phenol and a low-melting phenol-aldehyde condensate or flexibility may be imparted by larger amounts of a soft epoxide. In general, operable products are those in which the ratio of epoxide to polyhydric phenol ranges from about 6:1 to 1:6 with the preferred range, because of the general overall characteristics, being from 2:1 to 1:2 on an equivalent basis. In instances where an aldehyde condensate is used as a modifier, operable amounts on a weight basis range up to about 70% but from a practical standpoint, the preferred percentage is about 10%. Equivalents, as expressed here, refer to the weight of the polyhydric phenol per hydroxyl group in the case of the phenol and to the weight of the epoxide per epoxide group in the case of the polyepoxide.

Compositions containing the polyepoxides and the polyhydric phenols or such compositions modified with aldehyde condensates may be used as mixtures or at varying intermediate stages of reaction. The initial mixtures or intermediate reaction products which are soluble in common organic solvents may be blended in solution in proper proportions and the solutions then applied as an impregnant for fabrics or paper, or for the formation of protective coating films. Subsequent heating functions to remove the solvent and bring about polymerization to the insoluble, infusible state. For other uses, the initial or intermediate mixture may be used together without a solvent, giving directly a composition which, on the application of heat, converts to an infusible, insoluble final product.

For the preparation of semi-liquid adhesive compositions, low-melting or syrupy polyepoxides would be used with a low-melting polyhydric phenol or polyhydric phenol and aldehyde condensate. For various other applications, higher melting compositions are desirable in which case partially polymerized mixtures of the polyepoxide and the polyhydric phenol could be advantageously used. An alternative method of obtaining the higher melting compositions is to choose higher melting forms of the polyepoxide and polyhydric phenol.

In making the new compositions and products herein described, the polyepoxides and the polyhydric phenols or such compositions modified with aldehyde condensates may be used in regulated proportions without the addition of other materials. For certain uses, other components are often advantageously added, including filling and compounding materials, plasticizers, pigments, etc. Compositions which tend to give somewhat brittle products on conversion to the insoluble, infusible state are advantageously compounded with plasticizers. For most applications, however, it is possible to obtain suitable flexibility and toughness by regulating the proportions and types of reacting ingredients, thereby obviating the need for plasticizers.

The application of heat to the mixtures herein set forth may involve several chemical reactions. It will be appreciated that the reactions involved are very complex and the extent to which each takes place will vary with the temperature used in heat treating, the period of time therefor, and with the particular types of polyepoxides, aldehyde condensate, if used, and polyhydric phenol chosen. While it is not desired to be limited by any theoretical explanation of the exact nature of these reactions, it seems probable that conversion to the final polymeric products is accompanied by direct polymerization of the epoxide groups inter se; reaction of the epoxide groups with methylol hydroxyl groups; reaction of the epoxide groups with phenolic hydroxyl groups, and reaction of epoxide groups with active hydrogen attached to a nitrogen atom, all of which take place to some extent simultaneously in forming the final products.

The present invention provides a wide range of reaction compositions and products including initial mixtures of the polyepoxides, aldehyde condensates, and the polyhydric phenols, partial or intermediate reaction products of such mixtures and compositions containing such intermediate reaction products as well as final reaction products. In general, the initial mixtures, as well as the intermediate reaction products unless too highly polymerized, are soluble in solvents of the lacquer type, such as ketone or ester solvents.

In addition to having outstanding physical properties, such as hardness, toughness, and flexibility, the final infusible, insoluble products have outstanding chemical properties, such as high resistance to oxidation, water, alkali, acids, and organic solvents. It has also been observed that the final conversion products possess unusually good adhesion to most surfaces including metal, glass, wood, and plastics. This property of outstanding adhesion to a wide variety of surfaces gives the subject products high potential value for use in formulating adhesives. This property is also of extreme value in formulating protective coating films for use on many types of surfaces. The adhesion characteristics are probably due to the fact that even in the converted, infusible state, the compositions contain a relatively high percentage of highly polar groups, such as ether groups, ester groups, and alcoholic and phenolic hydroxyl groups. Despite the high percentage of polar groups in the insoluble, infusible products of this invention the tolerance for water is unusually low, apparently due to the high molecular weight and rigid crosslinked structure of the final compositions.

Examples 27 to 295, inclusive, illustrate the preparation of insoluble, infusible protective coating films from the compositions of this invention. In the preparation of the compositions for heat curing to form the protective coating films, each of the polyamide polyhydric phenols was dissolved in dimethylformamide and the polyester polyhydric phenols as well as the polyepoxides with the exception of the epoxidized polyesters were dissolved in methyl ethyl ketone to a nonvolatile content of 40–60%. The epoxidized polyesters were used at the nonvolatile and in the solvent in which they were prepared. The aldehyde condensates were dissolved in a mixture of methyl ethyl ketone and butanol to a nonvolatile content of 40–60%. Mixtures of the resinous polyhydric phenols and polyepoxides or such compositions modified with aldehyde condensates were found to be stable for extended periods of time at normal temperatures. Mixtures of the solutions were spread on panels with a .002" Bird applicator and the films were baked for periods of 30 to 60 minutes at temperatures ranging from 175 to 200° C. Proportions as used in the following table refer to parts by weight and are based on the nonvolatile content of the solutions of reactants.

| Ex. No. | Parts of polyepoxide | Parts of polyhydric phenol | Parts of aldehyde condensate | Baking schedule, min./° C. | Film resistance Boiling water, hr. | Film resistance 5% aqueous NaOH at 25° C., hr. |
|---|---|---|---|---|---|---|
| 27a | 10.0 Epon 864 | 5.9 Ex. 8 | | 30/175 | 2 | 6 |
| 28b | do | 3.6 Ex. 9 | | 30/175 | ½ | 22 |
| 29c | do | 3.1 Ex. 10 | | 30/175 | ⅓ | 168 |
| 30d | do | 1.9 Ex. 12 | | 30/175 | ⅙ | 168 |
| 31e | 10.0 Epon 1001 | 4.1 Ex. 8 | | 30/175 | 4 | 22 |
| 32d | do | 2.5 Ex. 9 | | 30/175 | 7½ | 6 |
| 33d | do | 2.2 Ex. 10 | | 30/175 | 5 | 168 |
| 34g | do | 1.3 Ex. 12 | | 30/175 | 3 | 168 |
| 35f | 10.0 Epon 1004 | 2.2 Ex. 8 | | 30/175 | 3 | 168 |
| 36g | do | 1.4 Ex. 9 | | 30/175 | 2½ | 168 |
| 37g | do | 1.2 Ex. 10 | | 30/175 | 4½ | 168 |
| 38g | do | 0.7 Ex. 12 | | 30/175 | ⅙ | 168 |
| 39g | 10.0 Epon 1007 | 1.1 Ex. 8 | | 30/175 | ¼ | 4 |
| 40h | do | 0.7 Ex. 9 | | 30/175 | ¼ | 6 |
| 41h | do | 0.6 Ex. 10 | | 30/175 | ¼ | 168 |
| 42h | do | 0.4 Ex. 12 | | 30/175 | ¼ | 168 |
| 43g | 10.0 Ex. 13 | 6.3 Ex. 8 | | 30/200 | 8 | 18 |
| 44h | 10.0 Ex. 13 | 2.6 Ex. 12 | | 30/175 | ⅙ | 1 |
| 45g | 10.0 Ex. 14 | 6.0 Ex. 8 | | 30/175 | ¼ | 1 |
| 46h | 10.0 Ex. 14 | 3.7 Ex. 9 | | 30/175 | ¼ | 1 |
| 47 | 10.0 Ex. 14 | 3.7 Ex. 9 | | 30/200 | 8 | 20 |
| 48h | 10.0 Ex. 14 | 3.2 Ex. 10 | | 30/175 | ¼ | 4 |
| 49h | 10.0 Ex. 14 | 1.9 Ex. 12 | | 30/175 | ⅓ | 1 |
| 50 | 10.0 Ex. 14 | 1.9 Ex. 12 | | 30/200 | 8 | ⅓ |
| 51 | 10.0 Ex. 15 | 4.5 Ex. 9 | | 30/175 | 7 | 8 |
| 52 | 10.0 Ex. 15 | 3.9 Ex. 10 | | 30/175 | 8 | 168 |
| 53h | 10.0 Ex. 16 | 4.1 Ex. 9 | | 30/200 | ¾ | ⅙ |
| 54b | 10.0 Ex. 16 | 2.2 Ex. 11 | | 30/175 | ⅙ | 24 |
| 55h | 10.0 Ex. 16 | 4.1 Ex. 9 | 1.5 Ex. 21 | 30/200 | 8 | 3 |
| 56h | 10.0 Ex. 16 | 4.1 Ex. 9 | 3.0 Ex. 25 | 30/200 | 8 | 3 |
| 57b | 10.0 Ex. 16 | 2.2 Ex. 11 | 1.2 Ex. 19 | 30/200 | 4 | 3 |
| 58b | 10.0 Ex. 16 | 2.2 Ex. 11 | 1.2 Ex. 26 | 30/200 | ¼ | 3 |
| 59f | 10.0 Ex. 17 | 13.1 Ex. 8 | | 30/175 | 1 | 6 |
| 60d | 10.0 Ex. 17 | 8.0 Ex. 9 | | 30/175 | 1 | 4 |
| 61g | 10.0 Ex. 17 | 6.9 Ex. 10 | | 30/175 | 1½ | 1 |
| 62h | 10.0 Ex. 17 | 4.3 Ex. 12 | | 30/175 | 1½ | ½ |
| 63 | 10.0 Ex. 17 | 4.3 Ex. 12 | | 30/200 | 8 | 29 |
| 64g | 5.0 Ex. 18 | 9.8 Ex. 8 | | 30/175 | ⅙ | 4 |
| 65h | 5.0 Ex. 18 | 6.1 Ex. 9 | | 30/175 | ⅙ | 1 |
| 66 | 5.0 Ex. 18 | 6.1 Ex. 9 | | 30/200 | 8 | ¼ |
| 67b | 5.0 Ex. 18 | 5.3 Ex. 10 | | 30/175 | ⅙ | 1 |
| 68h | 5.0 Ex. 18 | 3.2 Ex. 12 | | 30/175 | ⅙ | 1 |
| 69 | 10.0 Epon 864 | 3.6 Ex. 9 | 1.4 Ex. 26 | 30/175 | 5 | 96 |
| 70 | do | 3.1 Ex. 10 | 1.3 Ex. 25 | 30/175 | 7 | 168 |
| 71 | 10.0 Epon 1001 | 2.5 Ex. 9 | 1.3 Ex. 25 | 60/175 | 7 | 168 |
| 72 | do | 1.3 Ex. 11 | 2.2 Ex. 26 | 30/175 | 1 | 144 |
| 73 | do | 1.3 Ex. 11 | 1.1 Ex. 25 | 30/175 | 2 | 168 |
| 74f | 10.0 Epon 1004 | 2.2 Ex. 8 | 1.2 Ex. 24 | 30/200 | 8 | 24 |
| 75f | do | 1.4 Ex. 9 | 1.1 Ex. 24 | 30/200 | 8 | 24 |
| 76h | do | 0.7 Ex. 11 | 1.1 Ex. 24 | 30/175 | 6½ | ½ |
| 77 | 10.0 Epon 1007 | 0.7 Ex. 9 | 1.1 Ex. 26 | 30/175 | ⅙ | 137 |
| 78h | do | 0.4 Ex. 11 | 1.0 Ex. 24 | 30/175 | 1 | 168 |
| 79 | do | 0.4 Ex. 11 | 2.0 Ex. 26 | 30/200 | 1½ | 168 |
| 80d | 10.0 Ex. 13 | 8.2 Ex. 8 | 1.8 Ex. 24 | 30/175 | 2 | ½ |
| 81g | 10.0 Ex. 13 | 5.1 Ex. 9 | 1.5 Ex. 24 | 30/175 | 1 | 20 |
| 82c | 10.0 Ex. 13 | 2.6 Ex. 11 | 1.3 Ex. 26 | 30/175 | ½ | 20 |
| 83 | 10.0 Ex. 14 | 6.0 Ex. 8 | 3.2 Ex. 25 | 30/175 | 8 | 7 |
| 84 | 10.0 Ex. 14 | 3.7 Ex. 9 | 2.6 Ex. 26 | 30/175 | 1 | 120 |
| 85 | 10.0 Ex. 14 | 3.7 Ex. 9 | 1.3 Ex. 25 | 30/200 | 8 | 5 |
| 86 | 10.0 Ex. 14 | 3.2 Ex. 10 | 2.6 Ex. 26 | 30/175 | 8 | 144 |
| 87 | 10.0 Ex. 15 | 4.5 Ex. 9 | 1.5 Ex. 24 | 30/175 | 8 | 8 |
| 88 | 10.0 Ex. 15 | 2.4 Ex. 11 | 1.2 Ex. 26 | 30/200 | 8 | 5 |
| 89 | 10.0 Ex. 16 | 5.0 Ex. 1 | | 30/200 | ¾ | 18 |
| 90 | 10.0 Ex. 16 | 5.0 Ex. 1 | 2.6 Ex. 20 | 30/200 | ¼ | 2½ |
| 91 | 10.0 Ex. 16 | 5.0 Ex. 1 | 2.6 Ex. 26 | 30/200 | ¾ | 3½ |
| 92 | 10.0 Ex. 16 | 5.0 Ex. 1 | 2.6 Ex. 24 | 30/200 | 11 | 1¼ |
| 93 | 10.0 Ex. 16 | 5.0 Ex. 2 | | 30/200 | ¾ | 3½ |
| 94 | 10.0 Ex. 16 | 5.0 Ex. 2 | 4.1 Ex. 19 | 30/200 | ¼ | 3½ |
| 95 | 10.0 Ex. 16 | 5.2 Ex. 3 | | 30/200 | 6 | 3½ |
| 96 | 10.0 Ex. 16 | 5.2 Ex. 3 | 2.6 Ex. 20 | 30/200 | ¾ | 5 |
| 97 | 10.0 Ex. 16 | 5.2 Ex. 3 | 2.6 Ex. 25 | 30/200 | ¾ | 2 |
| 98 | 10.0 Ex. 16 | 5.3 Ex. 4 | | 30/200 | 2 | 1¼ |
| 99 | 10.0 Ex. 16 | 5.4 Ex. 4 | 2.6 Ex. 25 | 30/200 | 2 | 2½ |
| 100 | 10.0 Ex. 16 | 5.4 Ex. 4 | 4.1 Ex. 19 | 30/200 | ¾ | 55 |
| 101 | 10.6 Ex. 16 | 5.4 Ex. 5 | | 30/200 | ¾ | 7 |
| 102 | 10.0 Ex. 16 | 5.4 Ex. 5 | 2.6 Ex. 20 | 30/200 | 12 | 2½ |
| 103 | 10.0 Ex. 16 | 5.4 Ex. 5 | 2.6 Ex. 24 | 30/200 | ¾ | 3½ |
| 104 | 10.0 Ex. 16 | 5.4 Ex. 6 | | 30/200 | 12 | 20 |
| 105 | 10.0 Ex. 16 | 5.4 Ex. 6 | 2.6 Ex. 21 | 30/200 | 2½ | 3½ |
| 106 | 10.0 Ex. 16 | 5.4 Ex. 6 | 2.6 Ex. 24 | 30/200 | 12 | 2¼ |
| 107 | 10.0 Ex. 16 | 5.4 Ex. 6 | 2.6 Ex. 22 | 30/200 | 12 | 17 |
| 108 | 10.0 Ex. 16 | 6.1 Ex. 7 | | 30/200 | 12 | 3½ |
| 109 | 10.0 Ex. 16 | 6.1 Ex. 7 | 2.7 Ex. 20 | 30/200 | ¾ | 3½ |
| 110 | 10.0 Ex. 16 | 6.1 Ex. 7 | 2.7 Ex. 26 | 30/200 | ¼ | 5 |
| 111 | 10.0 Ex. 17 | 13.1 Ex. 8 | 4.6 Ex. 26 | 30/175 | 8 | 7 |
| 112 | 10.0 Ex. 17 | 8.0 Ex. 9 | 1.8 Ex. 24 | 30/175 | 8 | 7 |
| 113 | 10.0 Ex. 17 | 7.0 Ex. 10 | 1.7 Ex. 25 | 30/175 | 8 | 24 |
| 114h | 10.0 Ex. 17 | 4.3 Ex. 11 | 1.4 Ex. 24 | 30/175 | 4½ | 7 |
| 115 | 10.0 Ex. 17 | 4.3 Ex. 11 | 2.8 Ex. 26 | 30/175 | 7½ | 7 |
| 116 | 5.0 Ex. 18 | 6.1 Ex. 9 | 1.1 Ex. 26 | 30/175 | ⅔ | 56 |
| 117 | 5.0 Ex. 18 | 5.3 Ex. 10 | 1.0 Ex. 26 | 30/175 | 3 | 8 |
| 118 | 5.0 Ex. 18 | 3.2 Ex. 11 | 1.6 Ex. 25 | 30/175 | 7 | 8 |
| 119 | 10.0 Epon 864 | 5.9 Ex. 8 | 1.6 Ex. 19 | 30/175 | 2 | 168 |
| 120 | do | 5.9 Ex. 8 | 3.2 Ex. 20 | 30/175 | 8 | 168 |
| 121 | do | 5.9 Ex. 8 | 1.6 Ex. 21 | 30/175 | 8 | 168 |
| 122 | do | 3.6 Ex. 9 | 1.4 Ex. 20 | 30/175 | 8 | 168 |
| 123 | do | 3.6 Ex. 9 | 2.8 Ex. 21 | 30/175 | 8 | 168 |
| 124 | do | 3.6 Ex. 9 | 1.4 Ex. 22 | 30/175 | 6½ | 168 |
| 125 | do | 3.1 Ex. 10 | 2.6 Ex. 20 | 30/175 | 8 | |
| 126 | do | 3.1 Ex. 10 | 1.3 Ex. 21 | 30/175 | 8 | 168 |
| 127 | do | 1.9 Ex. 11 | 1.2 Ex. 20 | 30/175 | 8 | 168 |

See footnotes at end of table.

| Ex. No. | Parts of polyepoxide | Parts of polyhydric phenol | Parts of aldehyde condensate | Baking schedule, min./° C. | Film resistance Boiling water, hr. | Film resistance 5% aqueous NaOH at 25° C., hr. |
|---|---|---|---|---|---|---|
| 128 | do | 1.9 Ex. 11 | 2.4 Ex. 21 | 30/175 | 3 | 168 |
| 129 | 10.0 Epon 1001 | 4.1 Ex. 8 | 1.4 Ex. 20 | 30/175 | 8 | 168 |
| 130 | do | 4.1 Ex. 8 | 2.8 Ex. 21 | 30/175 | 8 | 168 |
| 131 | do | 2.5 Ex. 9 | 2.6 Ex. 20 | 30/175 | 8 | 168 |
| 132 | do | 2.5 Ex. 9 | 1.3 Ex. 21 | 30/175 | 8 | 168 |
| 133 | do | 2.2 Ex. 10 | 1.2 Ex. 20 | 30/175 | 8 | 168 |
| 134 | do | 2.2 Ex. 10 | 2.4 Ex. 21 | 30/175 | 8 | 168 |
| 135 | do | 1.3 Ex. 11 | 1.1 Ex. 20 | 30/175 | 8 | 168 |
| 136 | do | 1.3 Ex. 11 | 1.1 Ex. 21 | 30/175 | 3 | 168 |
| 137 | 10.0 Epon 1004 | 2.2 Ex. 8 | 2.4 Ex. 20 | 30/175 | 3 | 168 |
| 138 | do | 2.2 Ex. 8 | 1.2 Ex. 21 | 30/175 | ¼ | 168 |
| 139 | do | 1.4 Ex. 9 | 1.1 Ex. 19 | 30/175 | ⅓ | 168 |
| 140 | do | 1.4 Ex. 9 | 1.1 Ex. 20 | 30/175 | 8 | 168 |
| 141 | do | 1.4 Ex. 9 | 2.2 Ex. 21 | 30/175 | ⅙ | 168 |
| 142 | do | 1.2 Ex. 10 | 2.2 Ex. 20 | 30/175 | ⅙ | 168 |
| 143 | do | 1.2 Ex. 10 | 1.1 Ex. 21 | 30/175 | ⅙ | 168 |
| 144 | do | 1.2 Ex. 10 | 1.1 Ex. 22 | 30/175 | 1 | 41 |
| 145 | do | 0.7 Ex. 11 | 1.0 Ex. 20 | 30/175 | 6 | 168 |
| 146 | do | 0.7 Ex. 11 | 2.0 Ex. 21 | 30/175 | ⅙ | 168 |
| 147 | 10.0 Epon 1007 | 0.7 Ex. 9 | 2.0 Ex. 19 | 30/175 | ½ | 168 |
| 148 | do | 0.4 Ex. 11 | 1.0 Ex. 22 | 30/175 | 1 | 168 |
| 149 | do | 0.4 Ex. 11 | 1.0 Ex. 23 | 30/175 | ⅓ | 113 |
| 150 g | 10.0 Ex. 13 | 5.1 Ex. 9 | 1.5 Ex. 19 | 30/175 | 3 | 5 |
| 151 g | 10.0 Ex. 13 | 5.1 Ex. 9 | 1.5 Ex. 23 | 30/200 | 8 | 20 |
| 152 h | 10.0 Ex. 13 | 2.6 Ex. 11 | 2.6 Ex. 19 | 30/175 | 1 | 20 |
| 153 h | 10.0 Ex. 13 | 2.6 Ex. 11 | 2.6 Ex. 20 | 30/175 | ½ | 5 |
| 154 | 10.0 Ex. 14 | 6.0 Ex. 8 | 1.6 Ex. 19 | 30/175 | 1/12 | ½ |
| 155 | 10.0 Ex. 14 | 3.7 Ex. 9 | 1.4 Ex. 20 | 30/175 | ⅙ | ½ |
| 156 | 10.0 Ex. 14 | 3.2 Ex. 10 | 1.3 Ex. 21 | 30/175 | ⅙ | ½ |
| 157 | 10.0 Ex. 14 | 1.9 Ex. 11 | 1.2 Ex. 122 | 30/175 | 7 | 3 |
| 158 h | 10.0 Ex. 15 | 4.5 Ex. 9 | 1.5 Ex. 21 | 30/200 | 8 | 17 |
| 159 | 10.0 Ex. 15 | 4.5 Ex. 9 | 1.5 Ex. 23 | 30/175 | 8 | ½ |
| 160 h | 10.0 Ex. 15 | 3.9 Ex. 10 | 1.4 Ex. 23 | 30/175 | 8 | 24 |
| 161 h | 10.0 Ex. 15 | 2.4 Ex. 11 | 1.2 Ex. 19 | 30/200 | 1 | 17 |
| 162 h | 10.0 Ex. 15 | 2.4 Ex. 11 | 1.2 Ex. 22 | 30/175 | 8 | 8 |
| 163 | 10.0 Ex. 17 | 13.1 Ex. 8 | 2.3 Ex. 19 | 30/175 | 8 | 22 |
| 164 | 10.0 Ex. 17 | 13.1 Ex. 8 | 2.3 Ex. 22 | 30/175 | 8 | 1 |
| 165 | 10.0 Ex. 17 | 8.0 Ex. 9 | 1.8 Ex. 21 | 30/175 | 8 | 1 |
| 166 | 10.0 Ex. 17 | 8.0 Ex. 9 | 1.8 Ex. 23 | 30/175 | 8 | 22 |
| 167 | 10.0 Ex. 17 | 6.9 Ex. 10 | 1.7 Ex. 20 | 30/175 | 8 | 157 |
| 168 | 10.0 Ex. 17 | 4.3 Ex. 11 | 1.4 Ex. 19 | 30/175 | 8 | 8 |
| 169 | 10.0 Ex. 17 | 4.3 Ex. 11 | 2.8 Ex. 21 | 30/175 | 8 | 6 |
| 170 | 10.0 Ex. 17 | 4.3 Ex. 11 | 1.4 Ex. 22 | 30/175 | 8 | 22 |
| 171 | 5.0 Ex. 18 | 9.9 Ex. 8 | 1.4 Ex. 20 | 30/175 | 8 | 1 |
| 172 | 5.0 Ex. 18 | 6.1 Ex. 9 | 1.1 Ex. 19 | 30/175 | 6 | 8 |
| 173 | 5.0 Ex. 18 | 5.3 Ex. 10 | 1.0 Ex. 20 | 30/175 | 8 | 1 |
| 174 | 5.0 Ex. 18 | 5.3 Ex. 10 | 1.0 Ex. 21 | 30/175 | 3 | 8 |
| 175 | 5.0 Ex. 18 | 3.2 Ex. 11 | 1.6 Ex. 19 | 30/175 | 8 | 8 |
| 176 | 5.0 Ex. 18 | 3.2 Ex. 11 | 0.8 Ex. 20 | 30/175 | 8 | 6 |
| 177 | 5.0 Ex. 18 | 3.2 Ex. 11 | 0.8 Ex. 23 | 30/175 | 12 | 168 |
| 178 | 10.0 Epon 864 | 4.2 Ex. 1 | | 30/175 | 12 | 168 |
| 179 | do | 4.3 Ex. 2 | | 30/175 | 12 | 168 |
| 180 | do | 4.4 Ex. 3 | | 30/175 | 1 | 168 |
| 181 | 10.0 Epon 1001 | 3.4 Ex. 5 | | 30/175 | 5 | 140 |
| 182 | do | 3.3 Ex. 6 | | 30/175 | 1 | 48 |
| 183 | do | 3.3 Ex. 4 | | 30/175 | 12 | 168 |
| 184 | 10.0 Epon 1004 | 3.6 Ex. 6 | | 30/175 | ¾ | 168 |
| 185 | do | 3.3 Ex. 1 | | 30/175 | ¼ | 168 |
| 186 | do | 2.0 Ex. 7 | | 30/175 | ¾ | 168 |
| 187 | do | 1.7 Ex. 2 | | 30/175 | ¼ | 168 |
| 188 | 10.0 Epon 1007 | 0.8 Ex. 1 | | 30/175 | 5 | 168 |
| 189 | do | 0.9 Ex. 3 | | 30/175 | ¾ | 168 |
| 190 | do | 0.9 Ex. 4 | | 30/175 | 8½ | 168 |
| 191 | 10.0 Ex. 13 | 5.3 Ex. 2 | | 30/175 | 12 | 8 |
| 192 | 10.0 Ex. 13 | 5.4 Ex. 3 | | 30/175 | ⅙ | 1 |
| 193 | 10.0 Ex. 13 | 5.6 Ex. 5 | | 30/175 | 12 | 1 |
| 194 | 10.0 Ex. 14 | 4.5 Ex. 1 | | 30/175 | 1¾ | 8 |
| 195 | 10.0 Ex. 14 | 4.6 Ex. 2 | | 30/175 | 6¾ | 1½ |
| 196 | 10.0 Ex. 14 | 4.8 Ex. 4 | | 30/175 | ⅙ | 1½ |
| 197 | 10.0 Ex. 14 | 4.9 Ex. 5 | | 30/175 | 12 | 1 |
| 198 | 10.0 Ex. 14 | 4.8 Ex. 6 | | 30/175 | 12 | 1½ |
| 199 | 10.0 Ex. 15 | 5.5 Ex. 1 | | 30/175 | 12 | 8 |
| 200 | 10.0 Ex. 15 | 5.7 Ex. 3 | | 30/175 | ⅙ | 1½ |
| 201 | 10.0 Ex. 15 | 5.9 Ex. 4 | | 30/175 | 1 | 1½ |
| 202 | 10.0 Ex. 15 | 6.0 Ex. 6 | | 30/175 | ⅓ | 1½ |
| 203 | 10.0 Ex. 15 | 6.7 Ex. 7 | | 30/175 | 12 | 2½ |
| 204 | 10.0 Ex. 17 | 9.8 Ex. 1 | | 30/175 | 12 | 1½ |
| 205 | 10.0 Ex. 17 | 10.0 Ex. 2 | | 30/175 | 6 | 2½ |
| 206 | 10.0 Ex. 17 | 10.0 Ex. 3 | | 30/175 | 2½ | 2½ |
| 207 | 10.0 Ex. 17 | 10.6 Ex. 4 | | 30/175 | 12 | 21 |
| 208 | 10.0 Ex. 17 | 10.7 Ex. 5 | | 30/175 | 12 | 21 |
| 209 | 10.0 Ex. 17 | 10.6 Ex. 6 | | 30/175 | 12 | 80 |
| 210 | 10.0 Ex. 17 | 12.0 Ex. 7 | | 30/175 | 1½ | 20 |
| 211 | 5.0 Ex. 18 | 7.4 Ex. 1 | | 30/175 | ¾ | 168 |
| 212 | 5.0 Ex. 18 | 7.5 Ex. 2 | | 30/175 | ¾ | 18 |
| 213 | 5.0 Ex. 18 | 7.7 Ex. 3 | | 30/175 | ¾ | 18 |
| 214 | 5.0 Ex. 18 | 8.0 Ex. 4 | | 30/175 | 8 | 168 |
| 215 | 5.0 Ex. 18 | 8.0 Ex. 6 | | 30/175 | 8 | 18 |
| 216 | 5.0 Ex. 18 | 9.1 Ex. 7 | | 30/175 | 12 | 168 |
| 217 | 10.0 Epon 864 | 4.2 Ex. 2 | 2.8 Ex. 24 | 30/175 | 5½ | 168 |
| 218 | do | 4.4 Ex. 3 | 2.8 Ex. 25 | 30/175 | 1¼ | 168 |
| 219 | do | 3.4 Ex. 5 | 2.6 Ex. 26 | 30/175 | 5½ | 168 |
| 220 | do | 3.3 Ex. 6 | 2.6 Ex. 26 | 30/175 | 1 | 22 |
| 221 | do | 3.3 Ex. 4 | 2.6 Ex. 26 | 30/175 | 3 | 168 |
| 222 | 10.0 Epon 1004 | 2.0 Ex. 7 | 2.4 Ex. 25 | 30/175 | ¾ | 168 |
| 223 | do | 1.7 Ex. 2 | 2.3 Ex. 25 | 30/175 | 5 | 168 |
| 224 | 10.0 Epon 1007 | 0.9 Ex. 3 | 2.0 Ex. 26 | 30/175 | ½ | 22 |
| 225 | do | 0.9 Ex. 4 | 2.0 Ex. 26 | 30/175 | ¼ | 46 |
| 226 | do | 0.9 Ex. 4 | 2.0 Ex. 24 | 30/175 | 4 | 168 |
| 227 | do | 0.8 Ex. 1 | 2.0 Ex. 25 | 30/175 | 9 | 1½ |
| 228 | 10.0 Ex. 13 | 5.2 Ex. 1 | 3.0 Ex. 25 | 30/175 | | |

See footnotes at end of table.

| Ex. No. | Parts of polyepoxide | Parts of polyhydric phenol | Parts of aldehyde condensate | Baking schedule, min./° C. | Film resistance Boiling water, hr. | Film resistance 5% aqueous NaOH at 25° C., hr. |
|---|---|---|---|---|---|---|
| 229 | 10.0 Ex. 13 | 5.4 Ex. 3 | 3.0 Ex. 26 | 30/175 | ⅓ | 8 |
| 230 | 10.0 Ex. 13 | 5.6 Ex. 5 | 3.0 Ex. 26 | 30/175 | ⅙ | 1½ |
| 231 | 10.0 Ex. 13 | 6.4 Ex. 7 | 3.2 Ex. 26 | 30/175 | 2 | 38 |
| 232 | 10.0 Ex. 14 | 4.8 Ex. 4 | 2.9 Ex. 24 | 30/175 | 8½ | 8 |
| 231 | 10.0 Ex. 14 | 4.9 Ex. 5 | 2.9 Ex. 25 | 30/175 | 12 | 1 |
| 232 | 10.0 Ex. 14 | 4.5 Ex. 1 | 2.9 Ex. 26 | 30/175 | 8½ | 8 |
| 233 | 10.0 Ex. 15 | 5.5 Ex. 2 | 3.1 Ex. 24 | 30/175 | 12 | 19 |
| 234 | 10.0 Ex. 15 | 5.9 Ex. 4 | 3.2 Ex. 26 | 30/175 | 1 | 1½ |
| 235 | 10.0 Ex. 15 | 6.0 Ex. 6 | 3.2 Ex. 24 | 30/175 | 12 | 38 |
| 236 | 10.0 Ex. 17 | 9.8 Ex. 1 | 3.9 Ex. 25 | 30/175 | 12 | 21 |
| 237 | 10.0 Ex. 17 | 10.0 Ex. 2 | 4.0 Ex. 26 | 30/175 | 12 | 2½ |
| 238 | 10.0 Ex. 17 | 10.2 Ex. 3 | 4.0 Ex. 24 | 30/175 | 5 | 2½ |
| 239 | 10.0 Ex. 17 | 10.6 Ex. 4 | 4.1 Ex. 25 | 30/175 | 12 | 21 |
| 240 | 10.0 Ex. 17 | 10.7 Ex. 5 | 4.0 Ex. 25 | 30/175 | 12 | 70 |
| 241 | 10.0 Ex. 17 | 10.6 Ex. 6 | 4.0 Ex. 24 | 30/175 | 12 | 28 |
| 242 | 10.0 Ex. 17 | 12.0 Ex. 7 | 4.4 Ex. 26 | 30/175 | 12 | 28 |
| 243 | 5.0 Ex. 18 | 7.4 Ex. 1 | 3.4 Ex. 24 | 30/175 | ¾ | 24 |
| 244 | 5.0 Ex. 18 | 7.5 Ex. 2 | 3.5 Ex. 26 | 30/175 | 12 | 18 |
| 245 | 5.0 Ex. 18 | 7.7 Ex. 3 | 3.5 Ex. 25 | 30/175 | ¾ | 24 |
| 246 | 5.0 Ex. 18 | 8.0 Ex. 4 | 3.6 Ex. 25 | 30/175 | ¾ | 18 |
| 247 | 5.0 Ex. 18 | 8.0 Ex. 6 | 3.6 Ex. 26 | 30/175 | 8½ | 168 |
| 248 | 5.0 Ex. 18 | 9.1 Ex. 7 | 3.8 Ex. 25 | 30/175 | 8 | 67 |
| 249 | 10.0 Epon 864 | 4.2 Ex. 1 | 4.3 Ex. 19 | 30/175 | 12 | 168 |
| 250 | do | 4.3 Ex. 2 | 2.8 Ex. 21 | 30/175 | 12 | 168 |
| 251 | do | 4.4 Ex. 3 | 2.8 Ex. 21 | 30/175 | 12 | 24 |
| 252 | do | 4.5 Ex. 4 | 2.9 Ex. 22 | 30/175 | 1½ | 168 |
| 253 | do | 4.5 Ex. 4 | 2.9 Ex. 23 | 30/175 | 12 | 56 |
| 254 | 10.0 Epon 1001 | 3.4 Ex. 5 | 2.6 Ex. 20 | 30/174 | 5½ | 168 |
| 255 | do | 3.3 Ex. 4 | 2.6 Ex. 20 | 30/175 | 1 | 168 |
| 256 | 10.0 Epon 1004 | 3.6 Ex. 6 | 2.7 Ex. 20 | 30/175 | 3 | 168 |
| 257 | do | 1.7 Ex. 2 | 2.3 Ex. 21 | 30/175 | ¾ | 168 |
| 258 | 10.0 Epon 1007 | 0.9 Ex. 3 | 2.0 Ex. 20 | 30/175 | ¼ | 46 |
| 259 | do | 0.9 Ex. 4 | 3.0 Ex. 19 | 30/175 | 5 | 168 |
| 260 | do | 0.9 Ex. 4 | 2.0 Ex. 23 | 30/175 | ¼ | 168 |
| 261 | do | 1.0 Ex. 7 | 2.2 Ex. 21 | 30/175 | ¼ | 168 |
| 262 | 10.0 Ex. 13 | 5.2 Ex. 1 | 4.7 Ex. 19 | 30/175 | ⅙ | 1 |
| 263 | 10.0 Ex. 13 | 5.3 Ex. 2 | 3.0 Ex. 23 | 30/175 | 8½ | 18 |
| 264 | 10.0 Ex. 13 | 5.4 Ex. 3 | 3.0 Ex. 20 | 30/175 | 12 | 1½ |
| 265 | 10.0 Ex. 13 | 5.6 Ex. 6 | 3.1 Ex. 21 | 30/175 | 1 | 1 |
| 266 | 10.0 Ex. 14 | 4.5 Ex. 1 | 2.8 Ex. 20 | 30/175 | 12 | 1½ |
| 267 | 10.0 Ex. 14 | 4.7 Ex. 3 | 2.8 Ex. 22 | 30/175 | 12 | 1½ |
| 268 | 10.0 Ex. 14 | 4.8 Ex. 4 | 2.9 Ex. 21 | 30/175 | 9 | 3¼ |
| 269 | 10.0 Ex. 14 | 4.9 Ex. 5 | 4.5 Ex. 19 | 30/175 | ⅙ | 8 |
| 279 | 10.0 Ex. 15 | 5.5 Ex. 2 | 3.1 Ex. 22 | 30/175 | 12 | 32 |
| 280 | 10.0 Ex. 15 | 6.0 Ex. 6 | 3.2 Ex. 23 | 30/175 | 12 | 1½ |
| 281 | 10.0 Ex. 15 | 6.7 Ex. 7 | 5.2 Ex. 19 | 30/175 | ½ | 1½ |
| 282 | 10.0 Ex. 15 | 6.7 Ex. 7 | 3.3 Ex. 23 | 30/175 | 12 | 1½ |
| 283 | 10.0 Ex. 17 | 9.8 Ex. 1 | 6.1 Ex. 19 | 30/175 | 12 | 2½ |
| 284 | 10.0 Ex. 17 | 10.0 Ex. 2 | 4.0 Ex. 23 | 30/175 | 12 | 2½ |
| 285 | 10.0 Ex. 17 | 10.2 Ex. 3 | 4.0 Ex. 22 | 30/175 | 12 | 21 |
| 286 | 10.0 Ex. 17 | 10.6 Ex. 4 | 4.1 Ex. 20 | 30/175 | 2½ | 2½ |
| 287 | 10.0 Ex. 17 | 10.7 Ex. 5 | 4.0 Ex. 21 | 30/175 | 12 | 21 |
| 288 | 10.0 Ex. 17 | 10.6 Ex. 6 | 4.1 Ex. 20 | 30/175 | 12 | 28 |
| 289 | 10.0 Ex. 17 | 12.0 Ex. 7 | 4.4 Ex. 23 | 30/175 | 12 | 28 |
| 290 | 5.0 Ex. 18 | 7.4 Ex. 1 | 5.4 Ex. 19 | 30/175 | ¾ | 18 |
| 291 | 5.0 Ex. 18 | 7.5 Ex. 2 | 3.5 Ex. 20 | 30/175 | ¾ | 2 |
| 292 | 5.0 Ex. 18 | 7.7 Ex. 3 | 3.5 Ex. 21 | 30/175 | ¾ | 18 |
| 293 | 5.0 Ex. 18 | 8.0 Ex. 4 | 3.6 Ex. 20 | 30/175 | ¾ | 2 |
| 294 | 5.0 Ex. 18 | 8.0 Ex. 6 | 3.6 Ex. 21 | 30/175 | 8 | 168 |
| 295 | 5.0 Ex. 18 | 9.1 Ex. 7 | 5.0 Ex. 19 | 30/175 | 8 | 18 | a 0.10 part NaOEt catalyst.
b 0.06 part NaOEt catalyst.
c 0.05 part NaOEt catalyst.
d 0.03 part NaOEt catalyst.
e 0.07 part NaOEt catalyst.
f 0.04 part NaOEt catalyst.
g 0.02 part NaOEt catalyst.
h 0.01 part NaOEt catalyst.

It should be appreciated that while there are above disclosed but a limited number of embodiments of this invention, it is possible to produce still other embodiments without departing from the inventive concept herein disclosed.

It is claimed and desired to secure by Letters Patent:
1. A new composition of matter comprising the condensation product obtained by heating (1) a polyhydric phenol, said polyhydric phenol being the condensation product of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and at least one member of the group consisting of a polyhydric alcohol and a polyamine, said polyamine containing at least one amino hydrogen atom in each amine group and being free from interfering substituents and (2) a polyepoxide containing an average of more than one oxirane group per molecule, wherein said polyepoxide is composed of the elements carbon, hydrogen, and oxygen, and having oxygen present only in the groups selected from the group consisting of —OH, —COO—, ethereal oxygen and oxirane groups, wherein the proportion of (1) to (2) are from 1:6 to 6:1 on an equivalent weight basis.

2. The composition of claim 1 wherein the proportions of 1 to 2 are from 1:2 to 2:1.

3. A new composition of matter as described in claim 2 wherein (1) is a polyhydric phenol, said polyhydric phenol being the condensation product of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and a polyhydric alcohol.

4. A new composition of matter as described in claim 2 wherein (1) is a polyhydric phenol, said polyhydric phenol being the condensation product of a pentanoic acid consisting essentially of 4,4 bis(4-hydroxyaryl)-pentanoic acid wherein the hydroxyaryl radical is a hydroxyphenyl radical and is free from substituents other than alkyl groups of from 1–5 carbon atoms and a polyamine, said polyamine containing at least one amino hydrogen atom in each amine group and being free from interfering substituents.

5. A new composition of matter as described in claim 2 wherein the pentanoic acid of (1) consists essentially of 4,4 bis(4-hydroxyaryl)pentanoic acid wherein the hydroxyaryl radical is a hydroxyphenyl radical and is free from substituents other than alkyl groups of one carbon atom.

6. A new composition of matter as described in claim 2, wherein the pentanoic acid of (1) is 4,4 bis(4-hydroxyphenyl)pentanoic acid.

7. A new composition of matter as described in claim 6 wherein (2) is a polyglycidyl ether of a member of the group consisting of polyhydric phenols and polyhydric alcohols.

8. A new composition of matter as described in claim 6 wherein (2) is a polyepoxide polyester of tetrahydrophthalic acid and a glycol wherein the epoxy oxygen bridges adjacent carbon atoms.

9. A new composition of matter as described in claim 6 wherein (2) is an aliphatic polyepoxide, said polyepoxide having functional groups selected from the group consisting of (a) epoxide groups and (b) epoxide and hydroxyl groups, wherein the epoxy oxygen atom bridges adjacent carbon atoms.

10. A new composition of matter comprising the condensation product obtained by heating (1) a polyhydric phenol, said polyhydric phenol being the condensation product of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and at least one member of the group consisting of a polyhydric alcohol and a polyamine, said polyamine containing at least one amino hydrogen atom in each amine group and being free from interfering substituents, (2) a polyepoxide containing an average of more than one oxirane group per molecule, wherein said polyepoxide is composed of the elements carbon, hydrogen, and oxygen, and having oxygen present only in the groups selected from the group consisting of —OH, —COO—, ethereal oxygen and oxirane groups, wherein the proportion of (1) to (2) are from 1:6 to 6:1 on an equivalent weight basis, and (3) up to about 70% by weight of a fusible condensation product of formaldehyde and formaldehyde engendering compounds and a member of the group consisting of a phenol and at least one organic ammonia derivative from the group consisting of urea, thiourea, melamine, p-toluenesulfonamide and alkyl derivatives thereof, wherein the proportion of (1) to (2) are from 1:6 to 6:1 on an equivalent weight basis.

11. A new composition of matter as described in claim 10 wherein (1) is a polyhydric phenol, said polyhydric phenol being the condensation product of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and polyhydric alcohol.

12. A new composition of matter as described in claim 10 wherein (1) is a polyhydric phenol, said polyhydric phenol being the condensation product of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and a polyamine, said polyamine containing at least one amino hydrogen atom in each amine group and being free from interfering substituents.

13. A new composition of matter as described in claim 10 wherein the pentanoic acid of (1) consists essentially of 4,4 bis(4-hydroxyaryl)pentanoic acid wherein the hydroxyaryl radical is a hydroxyphenyl radical and is free from substituents other than alkyl groups of one carbon atom.

14. A new composition of matter as described in claim 10 wherein the pentanoic acid of (1) is 4,4 bis(4-hydroxyphenyl)pentanoic acid.

15. A new composition of matter as described in claim 14 wherein (2) is a polyglycidyl ether of a member of the group consisting of polyhydric phenols and polyhydric alcohols.

16. A new composition of matter as described in claim 14 wherein (2) is a polyepoxide polyester of tetrahydrophthalic acid and a glycol wherein the epoxy oxygen bridges adjacent carbon atoms.

17. A new composition of matter as described in claim 14 wherein (2) is an aliphatic polyepoxide, said polyepoxide having functional groups selected from the groups consisting of (a) epoxide groups and (b) epoxide and hydroxyl groups, wherein the epoxy oxygen bridges adjacent carbon atoms.

18. A new composition of matter as described in claim 14 wherein (3) is up to about 20% by weight of the fusible condensation product of formaldehyde and phenol.

19. A new composition of matter as described in claim 14, wherein (3) is up to about 20% by weight of the fusible condensation product of formaldehyde and at least one organic ammonia derivative of the group consisting of urea, thiourea, melamine, p-toluenesulfonamide and alkyl derivatives thereof.

References Cited in the file of this patent

Bader et al.: J.A.C.S., volume 76, pp. 4465–4466. Copy in Scientific Library.

UNITED STATES PATENT OFFICE
CERTIFICATE OF CORRECTION

Patent No. 2,907,741                              October 6, 1959

Sylvan O. Greenlee

It is hereby certified that error appears in the printed specification of the above numbered patent requiring correction and that the said Letters Patent should read as corrected below.

Column 2, lines 65 to 68, Equation 1, the lower portion of the equation should appear as shown below instead of as in the patent:

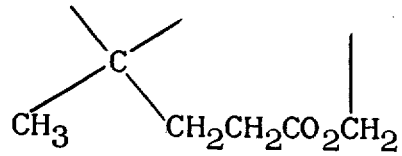

column 3, line 48, for "diphenolic acid" read -- Diphenolic Acid --; lines 69 and 72, for "diphenolic acids", each occurrence, read -- Diphenolic Acid --; same column 3, line 75, for "free of substituents other than" read -- alkylated with --; column 4, line 2, for "diphenolic acids" read -- Diphenolic Acid --; lines 57, 60, and column 5, line 29, for "diphenolic acid", each occurrence, read -- Diphenolic Acid --; column 5, lines 44, 50 and 51, 59 and 60, and column 6, lines 4, 8, and 11 and 12, for "diphenolic acids", each occurrence, read -- Diphenolic Acid --; column 6, line 16, for "diphenolic acid" read -- Diphenolic Acid --; column 8, line 42, for "4,4-bis(4-hydroxphenyl)pentanoic" read -- 4,4-bis(4-hydroxyphenyl)pentanoic --; column 18, line 15, for "co-called" read -- so-called --; columns 23 and 24, in the table, fourth column thereof, opposite Ex. No. 157, for "1.2 Ex. 122" read -- 1.2 Ex. 22 --; same columns 23 and 24, in the table, first column thereof, for "198", first occurrence, read -- 197 --; columns 25 and 26, in the table, first column thereof, fifth and sixth items, for "231 and 232" read -- 231.1 and 232.1 --; same columns 25 and 26, in the table, first column thereof, for the examples numbered "279 to 295", respectively, should be renumbered to read -- 270 to 286 --.

Signed and sealed this 11th day of October 1960.

(SEAL)
Attest:

KARL H. AXLINE                            ROBERT C. WATSON
Attesting Officer                       Commissioner of Patents